United States Patent Office 3,562,289
Patented Feb. 9, 1971

3,562,289
CHROMATOGRAPHIC SEPARATION PROCESS BY MEANS OF CELLULOSE CRYSTALLITE AGGREGATES DERIVATIVES
Orlando A. Battista, Yardley, and Charles J. Boone, Easton, Pa., assignors to FMC Corporation, Philadelphia, Pa., a corporation of Delaware
No Drawing. Continuation-in-part of applications Ser. No. 101,677, Apr. 10, 1961, and Ser. No. 167,904, Jan. 22, 1962. This application May 12, 1965, Ser. No. 455,344
Int. Cl. C07c 99/12; C07d 49/36
U.S. Cl. 260—309                                    5 Claims

ABSTRACT OF THE DISCLOSURE

Water-insoluble derivatives of cellulose crystallite aggregates having an average level-off D.P. of 15 to 375 and having ion-exchange functional groups are used in separating alkaloids, amino group-containing compounds, lipids, organic acids, racemates and sugars from mixtures containing the respective substances or compounds. A solution of a mixture containing the respective substances is brought into contact with the cellulose crystallite aggregates derivative and the substances adsorbed by the derivative, subsequently recovered by elution.

---

This application is a continuation-in-part of application Ser. No. 101,677, filed Apr. 10, 1961 and Ser. No. 167,904, filed Jan. 22, 1962, both now abandoned.

This invention relates to the separation of components from mixtures, such as mixtures of amino-group containing components, by means of adsorbents consisting essentially of derivatives of cellulose crystallite aggregates, particularly derivatives containing ionizable groups and capable of functioning as ion exchangers.

The preparation of amino acids, for example, from protein hydrolysates is a fairly convenient method of making these valuable compounds from inexpensive source materials; but their separation, recovery and purification is another matter, and it is to these last steps that the invention is addressed, as well as to the separation and/or purification of many other separable mixtures. By means of the present method, complex mixtures of amino acids, such as are found in protein hydrolysates, may be separated into individual acids or into small groups thereof which may be separated further by means of one or more additional steps. These separation steps may be accomplished with advantages over and above procedures using conventional ion exchangers, including resinous exchangers and those derived from conventional cellulose. With the adsorbents of the present invention, separations may be accomplished more efficiently, and sharper, more narrowly defined fractions are obtained than by the use of conventional derivatives of cellulose.

Cellulose crystallite aggregate derivatives utilized in the present method possess a number of desirable physical and mechanical characteristics over the conventional materials. For example, they are free of the dark colors and off odors which frequently characterize the resinous materials, and it is much easier to control their particle size by comparison with the latter.

In the case of conventional cellulose derivatives, their fibrous character leads to poor packing in the column and the creation of air spaces which cause channeling. On the other hand, the aggregates derivatives, being of particulate non-fibrous form, exhibit good packing characteristics and no channeling.

The aggregates derivatives are capable of being sieved to produce fractions of accurate and uniform particle size, and the size itself may be so small as to represent a different order of magnitude with respect to the fibrous conventional cellulose derivatives. As is known, the sharpness of separation of a feed mixture is generally increased as the particle size of the exchanger material is decreased. In consequence, the aggregates derivates may, if desired, have a surface area enormously greater than that of fibrous materials. The latter are difficult to sieve accurately, owing to their fibrous form, and it is not unusual to have particles possessing one dimension of the order of 1 or 2 microns but with a length extending up to 1000 microns or more.

Of particular significance is the fact that the aggregates derivatives have a higher bulk density than conventional cellulose materials; thus, for equal weights of the two derivatives the aggregates derivative would have a smaller volume, perhaps only 50% or less of the volume of the conventional material. If a feed mixture were to be separated by each matreial, the aggregates derivative would be wetted to a much smaller extent than the conventional material, and in turn the retention or hold-up loss would be much smaller. The advantage of the aggregates derivative is thus apparent, especially in the case of expensive feed mixtures or components thereof; also, the amount of eluting solvent would be less, and in turn there would be less solvent to evaporate from the eluted compound.

The aggregates derivatives have the particularly desirable advantage of being reproducible in a state of uniform high purity. This characteristic is not only valuable for separating mixtures that are sensitive to impurities, but it also represents an improvement over conventional cellulose derivatives the reproducibility of which fluctuates from batch to batch. As is known, conventional cellulose contains amorphous regions distributed throughout the cellulose chains thereof, the content of which includes xylans and mannans. The quantity of these latter materials is variable from cellulose to cellulose, as the latter varies from plant to plant and season to season, and in turn the derivatives made from the celluloses are variable in the same way from batch to batch. Because of these variations, it is practically impossible to obtain uniform or pure derivative products from conventional cellulose. In terms of ash content, the crytsallite aggregates derivatives may have an ash content of less than 500 p.p.m. and in many instances less than 100 p.p.m., whereas the conventional cellulose derivatives may have an ash content upward of 800 p.p.m.

In the case of separable feed mixtures like amino acids and proteins, the aggregates derivatives may exhibit a higher adsorptive capacity than both the resin and conventional cellulose derivative materials. Moreover, these feed mixtures, or components thereof, may be desorbed from the aggregates derivatives under mild conditions, that is, the desorbing or eluting solvent may be a mild chemical that does not attack the feed components or the derivative.

By virtue of these advantages, and others apparent hereinafter, the crystallite aggregates derivatives are capable of providing a superior separating action with respect to many feed mixtures.

The ion exchange derivatives of the aggregates may comprise either cation or anion exchangers.

Suitable cation exchangers are the carboxyl derivatives of cellulose crystallite aggregates, including the 6-carboxyl and the 2,3-dicarboxyl derivatives; mixed carboxyl- and aldehyde-containing derivatives of the aggregates; and the carboxy ether derivatives of the aggregates such as the carboxymethyl, carboxyethyl, and many other carboxyalkyl derivatives. Other useful materials include ester derivatives of inorganic acids such as the phosphate and sulfate derivatives of the aggregates; also ether derivatives of the phosphonoalkyl, sulfoalkyl, and sulfinoalkyl series, such as the phosphonomethyl, sulfomethyl, sulfoethyl, and sulfinomethyl derivatives. The sulfoalkyl derivatives contain sulfonic acid groups. Still other derivatives are the phosphorous acid esters, boric acid esters, and sulfurous acid esters; also organic acid esters such as the phthalate, sulfinate, and oxalate esters. Other esters include sulfonic acid and carboxylic acid esters wherein moieties of the type —$RSO_3H$ and —RCOOH are united to the carbonyl carbon of the ester group —OOC— through the R radicals, the latter being any suitable hydrocarbon radical.

Anion exchangers include alkylaminoalkyl ethers of the aggregates wherein the alkyl moieties may have 1 to 6 or more carbon atoms; for example, such derivatives include the diethylaminoethyl and triethylaminoethyl ethers of the aggregates. Another such derivative is the diethylamino-(2-hydroxypropyl) ether. Still another anion exchanger is the material formed by reacting epichlorohydrin and triethanolamine with the aggregates in the presence of caustic soda. Also, mono- and di-urea derivatives of the aggregates. Other basic group-containing derivatives are exemplified by the alkylaminoalkyl and alkylaminodialkyl esters of the aggregates.

As many be apparent, some of the derivatives have the ionizable group attached directly to the anhydroglucose units of the crystallite aggregates, while some have such group at the end of a chain which at its other end is attached to the anhydroglucose units.

Cellulose crystallite aggregates from which the various derivatives are made are small, preferably disintegrated, aggregates of level-off D.P. cellulose. These small disintegrated aggregates, their properties and a method of disintegrating the level-off D.P. cellulose are described in Pats. No. 2,978,446 and No. 3,023,104. They are acid-insoluble products produced by the controlled acid hydrolysis of cellulose and the level-off D.P. value reflects a destruction of the original fibrous structure of the cellulosic source material. The abbreviation D.P. is used in its ordinary sense to describe the molecular size or degree of polymerization of the polymer, cellulose, and designates the number of repeating units, anhydroglucose units, in the polymer. The molecular weight of the polymer is the product of the molecular weight of the repeating unit and the degree of polymerization. The term "level-off D.P." has reference to the average level-off degree of polymerization of the cellulose product measured in accordance with the paper by O. A. Battista entitled "Hydrolysis and Crystallization of Cellulose," vol. 42, Industrial and Engineering Chemistry, pp. 502–7 (1950).

As described in the aforementioned patents and publication, cellulose crystallite aggregates may be derived from any purified cellulose source material by subjecting the source material to treatment with 2.5 N hydrochloric acid solution for 15 minutes at boiling temperature or with an equivalent acid treatment. The acid dissolves the amorphous cellulose and non-cellulosic substances leaving as a residue particulate non-fibrous or crystalline cellulose. The length of the cellulose chains in the crystalline cellulose vary to a much lesser extent than the variations in the source material and, within the noted time period, the molecular weight or degree of polymerization of the undissolved cellulose levels off or reaches a substantially constant value. The degree of polymerization is calculated from measurements of viscosities of solutions of the cellulose in a cuprammonium solvent and, since cellulose contains cellulose chains of varying length, the measured viscosity is an average of the viscosity of all of the dissolved cellulose chains in the sample. Accordingly, the resulting crystalline cellulose is said to have an average level-off D.P. and the numerical value of D.P. will be within a range of 15 to 375, the specific value being dependent upon the specific source material.

The cellulose crystallite aggregates, or level-off D.P. cellulose, suitable for making derivatives is characterized by having an average level-off D.P. of 15 to 375. Associated with the foregoing D.P. properties of the crystallite aggregates is the fact that their chemical purity is very high, the material comprising at least 95%, preferably at least 97% or 99%, polyglucose, or anhydroglucose units, based on chromatographic analysis. In terms of ash content, the aggregates preferably contain less than 100 p.p.m. (parts per million), although ash may range from about 10 to about 400 or 500 p.p.m. By comparison, conventional fibrous cellulose may have 1000 to 4000 p.p.m. of ash.

It is preferred that the starting aggregates shall have a particle size of 5 microns or less, whether or not they have been attrited. As the production of particle sizes of 5 microns or less is favored by attrition, it is preferable to carry out such step, and if necessary, to resort to fractionation to obtain the desired sizes. Patricle sizes of 5 microns or less can be obtained by fractionating the non-attrited aggregates, although the yield may be less. The useful derivatives are characterized by their general insolubility, including their insolubility in water, various separable feed mixtures, and various eluants and regenerants; the derivatives are further characterized by being in the form of discrete, particulate, non-fibrous particles of a size in the preferred range of 30 to 70 microns, although they have been below 30 microns, or below 10 or 5 microns, and if desired, from 0.1 or 0.2 to 1 micron or more. These derivatives are essentially topochemical derivates in that the cellulose chains disposed in the surfaces of the aggregates are derivatized, rather than all of the chains of the aggregates. In terms of degree of substitution (D.S.), the derivatives may have a D.S. not greater than 1.0, preferably from 0.01 to about 0.85. The degree of substitution (D.S.) is used in its ordinary sense and designates the number of substituents per anhydroglucose unit.

During the acid hydrolysis of the cellulosic material to form uniform chain lengths of the crystallite aggregates, each chain so produced has a potential aldehyde group on one end, in particular, in the one position of the end anhydroglucose unit of the crystallite chain. By treating the aggregates with a suitable reducing agent, such as sodium borohydride, the potential aldehyde groups may be reduced to hydroxyl groups. As may be apparent, after reduction of the end aldehydic groups, such ends of the chains will have only hydroxyls as functional groups. Any other reducible groups on the chains will, of course, also be reduced. The borohydride is preferably added in successive small amounts to an aqueous dispersion of the aggregates, the temperature being kept at or near room temperature although it may range to about 50° C. When addition of the borohydride no longer produces a rise in temperature, the reaction is considered to be completed, and any excess reagent present may be destroyed by addition of acid. Other alkali borohydrides, such as those of potassium and lithium, are suitable. Aluminum alkoxides are also useful as well as the alkoxides of sodium, magnesium, zirconium and tin, which are usually employed in alcohol solution. Also useful are aluminum isopropoxide in isopropanol, aluminum ethorixe in ethanol, alkoxy magnesium halides, lithium aluminum hydride, sodium and sodium amalgam, aluminum amalgam, zinc dust plus acetic acid, etc.

The reduced aggregates are characterized by their general insolubility, including their insolubility in water, in various separable feed mixtures, and in various eluants and regenerants. They are further characterized by being in the form of very white, discrete, particulate, non-fibrous particles of a size in the preferred range of 44 to 75 microns, although they may be below 44 microns, or below 10 or 5 microns, and if desired, from 0.1 to 0.2 to 1 micron or more.

Other derivatives are carboxyl derivatives, derivatives containing both carboxyl and aldehyde radicals, ester derivatives, ether derivatives, combination derivatives of the cellulose crystallite aggregates and derivatives wherein the end potential aldehyde group of the cellulose chains have been oxidized to form a carboxyl group. Derivatives of cellulose crystallite aggregates and their preparation are disclosed in Pat. No. 3,111,513 and applications Ser. No. 2,134 and Serial No. 2,135, both filed Jan. 13, 1960, both now abandoned.

The method of this invention is of particular value in the separation and purification of biochemicals and other feed mixtures, particularly those having components containing amino groups, including mixtures of $\alpha$-amino acids from any source and desirably mixtures obtained by the acid, alkali, or enzymatic hydrolysis of protein materials of both animal and vegetable origin, and mixtures from biological extracts. Illustrative protein materials which may be hydrolyzed include casein, yeast, egg albumen and also albumen from milk, fish, elastin, keratin; vegetable proteins such as soy, edestin, zein, gliadin; also proteins of glue, gelatin, silk fibroin, silk gum, homoglobin, serum albumen, serum globulin, blood fibrin; and bovine serum and mixtures thereof with hemoglobin, human serum, horse serum, etc.

Other suitable feed mixtures are peptides, protein mixtures such as enzymes, muscle extracts, nucleic acids and their degradation products, etc. Of particular interest is the purification and recovery of enzyme-containing materials from animal spleen, heart, kidney, and liver preparations.

Another useful application of the invention is in the purification of impure organic acids, such as the commercial grades in which such acids are frequently supplied. A fractionation of the impure acid is possible, wherein lower and higher molecular weight materials, as well as the purified acid itself, may be obtained in definite fractions. Also, mixtures of acids may be separated into their components.

In still other applications, the method may be used to separate such materials as racemates, lipids, antihistaminic and other drugs, straight-and branched-chain compounds and rare earths; also to recover organic acids like citric, ascorbic, tartaric, etc. from citrus wastes, as well as to purify such acids and higher molecular weight unsaturated and saturated acyclic or fatty acids like linoleic, linolenic, oleic, ricinoleic, stearic, palmitic, etc. Amino acids and vitamins may be recovered from food processing wastes, enzymes from natural sources, metals from treating baths such as pickling and anodizing baths, valuable metals such as silver from photographic wastes. The invention is also of value for purifying antibiotics, chemical intermediates, tannins, nitrites, hexosephosphates, complex alcohols, hormones, toxins, growth regulators, higher fatty alcohols, dyes alkaloids, etc. Plant pigments may be isolated from natural mixtures of the same; thus, carotene lycopene, and various other colors may be separated from vegetable juices. Mixtures of carbohydrates are separable; illustrative of these is a mixture of cellobiose, dextrose, and xylose.

In order to separate the complex mixture of $\alpha$-amino acids present in a protein hydrolysate, it is desirable to separate them first into a series of groups using, say, a cation exchangers. In this connection, it is of interest to note that amino acids may be classified into four groups:

(1) basic amino acids comprising diaminomonocarboxylic acids having isoelectric points varying from 7.59 to 10.76 and including histidine, lysine, hydroxylysine, and arginine; (2) neutral amino acids comprising monoamino-monocarboxylic acids having isoelectric points from 5.6 to 6.3 and including serine, threonine, proline, hydroxyproline, glycine, alanine, valine, leucine, isoleucine and methionine; (3) acidic amino acids comprising mono-aminodicarboxylic acids with isoelectric points of 2.77 to 3.22 and including glutamic and aspartic acids; and (4) aromatic amino acids including phenylalanine, tyrosine, and tryptophane. It will be understood that the initial separation of the mixture of amino acids from the protein hydrolysate into groups will not necessarily produce groups of the foregoing composition, although in general it will be found that the order in which the acids are separated by the cation exchanger is in accordance with their increasing basicity, that is the more acidic acids are less strongly adsorbed and tend to pass out from the column first while the more basic acids are more strongly adsorbed and tend to be retained in the column. After separation of the groups, the separation of the individual acids of a group can be carried out separately, such as by means of a different exchanger material.

In general, the procedure for separating a feed mixture comprises placing a solution of the mixture (which may be the mixture dissolved in the eluant) on top of the column packed with the adsorbent. The mixture is then eluted through the column by means of a suitable solvent or eluant. Owing to the different degrees of association which may exist between the components of the mixture and the adsorbent in the column, the components move down the column at different rates. A separation is thus effected, and successive fractions of the eluant and one or more components are collected as they emerge from the bottom of the column.

Pressures of any suitable amount may be applied to improve the flow rate through the column.

The choice of eluant is variable; however, commonly used eluants include chloroform, chloroform-methanol mixtures, low molecular weight alcohols having 1 to 5 or 6 carbon atoms, n-butanol-isopropanol-water mixtures, water-aqueous acids such as 0.1 N HCl and 0.5 NHCl, n-butanol-isopropanol-0.1 N or 0.5 N HCl mixtures, n-butanol-acetic acid mixtures, n-butanol-acetic acid-water mixtures, n-butanol-acetic acid-water-2-ethylhexylamine mixtures, benzene, citric acid-sodium hydroxide-HCl-water mixtures, citric acid-acetic acid-sodium hydroxide-sodium acetate-water mixtures, phosphoric acid-sodium hydroxide mixtures, ethanol-HCl mixtures, dioxane, dimethyl formamide, aqueous salt solutions such as 0.1 M NaCl, and the like. Two or more different eluants may be used.

The pH of the eluant may be a factor in the separation of amino acids, proteins, and other mixtures. By changing the pH of the eluant, it may be possible to vary the degree of association of the various feed mixture components with the column material, thus affecting the rate at which they move down the column. There may be preferred pH values for the efficient separation of mixtures like the proteins and amino acids, and these values may be determined for a particular mixture.

Where batch separation is desired, the column material may be removed from the column in form of a moist cylinder and cut into sections, each section corresponding to a band of material plus adsorbed components, and the latter may then be removed by means of a suitable solvent. The use of the aggregates derivatives in this latter separation method provides an advantage over conventional cellulose derivatives in that the former, when cut into bands, will cut sharply and cleanly, whereas the conventional derivatives, being fibrous, do not cut sharply or cleanly but tend to tear. It may further be noted that the conventional derivatives tend to give bands along the column having indistinct boundaries, owing to the fibrousness of the derivatives.

A column material may be regenerated by passing a regenerating solvent or solution through the column which will displace any substances which may still be in the column. The solvents used, of course, will vary with the substances on the column and the column material. As an example, there may be mentioned the regeneration of the column of Example 3, after the purification of the lauric acid using ethanol as an eluant. This column may be regenerated by washing with 0.5 N ethanolic hydrochloric acid solution. After regeneration, the regenerating solution may be displaced by the solvent to be used for the eluant in the next run. In general, suitable regenerants include ethanolic HCl, ethanol, aqueous sodium chloride solutions, basic alcohol solutions such as 0.1 N ethanolic NaOH, aqueous acid solutions such as 0.5 N HCl, chloroform, etc. Other regenerants may be chosen from the above list of eluants.

In regard to the analysis of the separated products, both qualitative and quantitative methods may be employed. Qualitative tests consist of applying in a drop of the fraction being analyzed to a filter paper and then drying it as in an air oven. The filter paper is then sprayed with an appropriate reagent which will react with the material being analyzed to form a colored compound. For amino acids and proteins, ninhydrin spray reagent is suitable. For carbohydrates, o-aminodiphenyl may give satisfactory results; this is prepared by dissolving 3 gms. of o-aminodiphenyl in 100 ml. of glacial acetic acid containing 1.3 ml. 85% phosphoric acid.

For more quantitative work, several instruments and methods are available. In order to follow the concentrations of amino acids in the fractions collected, a colorimetric method using ninhydrin reagent is useful. This consists of the following procedure: Eight grams of sodium hydroxide are dissolved in 250 ml. of water and the pH of the solution adjusted to 5.0 by the addition of citric acid. To this solution there is added 0.4 gm. of stannous chloride, giving solution A. Solution B is prepared by dissolving 10 gms. of ninhydrin in 500 ml. of methyl Cellosolve. The ninhydrin reagent is prepared by adding solution A to solution B with stirring under nitrogen. One ml. of the fraction being analyzed is pipetted into a 25 ml. volumetric flask, and to it are added 2 ml. of the ninhydrin reagent. The mixture is heated in boiling water for 20 minutes, cooled, and diluted to the mark with a 50:50 by volume n-propanol-water solution. The optical density is then read at 570 millimicrons. A blank is prepared in the same way using 1 ml. of water in place of the 1 ml. aliquot of the fraction.

Another method of following the concentration of protein in some cases comprises reading, by aid of a spectrophotometer, the optical density of the fractions in the ultraviolet region. A differential refractometer may be used to follow the concentrations of materials like fatty acids.

The invention may be illustrated by the following examples:

EXAMPLE 1

The carboxymethyl derivative of cellulose crystallite aggregates was prepared as follows. About 250 grams of cellulose crystallite aggregates having an average level-off D.P. of 240–250, a moisture content of about 2.5% by weight, an ash content of 300 p.p.m. and the major portion having a particle size finer than 400 mesh were mixed with 375 g. of 40% aqueous caustic soda solution at room temperature for 30 minutes. About 154 g. of chloroacetic acid were added and mixing continued for 30 minutes. The mixing was done at room temperature but owing to the exothermic reaction the temperature rose to about 50° C. The mixture was then diluted with about 2 liters of water and neutralized with HCl to a pH of 7. It was then placed in cellophane dialysis tubing and dialyzed over three days into water to remove the sodium chloride. The resulting suspension of carboxymethyl aggregates was mixed with acetone to precipitate the derivative which was filtered and then dried in air. The derivative had a D.S. of about 0.5.

A slurry was formed by dispersing the carboxymethyl derivative in a solvent comprising one vol. of butanol, 2 vols. of isopropanol, and one vol. of water. The slurry (which provided a convenient way of placing the derivative in the exchange column, although it could also be introduced thereto in dry form) was then carefully poured down the side of a glass column 62 cm. long having an internal diameter of 1.5 cm. A previously introduced glass plug supported the derivative in the column. As the solvent drained from the column, additional quantities of the slurry were added to the top. When the derivative did not settle further, the solvent was allowed to drain, care being taken to prevent the derivative from drying out.

A mixture of commercial grade pure amino acids was prepared comprising 20 mg. of d-aspartic acid, 20 mg. of dl-alanine, and 20 mg. of l-histidine. This mixture was dissolved in a solvent comprising 1 vol. of butanol, 2 vols. of isopropanol and 1 vol. of 0.1 N hydrochloric acid. The total volume of the solution was 10 ml. which was added to the top of the column and allowed to drain therethrough, care being taken to keep the liquid level above the top of the packed derivatives. After addition of the charge, and without exposing the top of the packed derivative, eluting solvent was introduced to the column at a rate of 3 ml. for 25 minutes. The solvent had the same composition as that used to make up the slurry of the derivative, and served to aid the flow of the amino acids through the column at different rates, thus developing the chromatogram. The effluent from the column was collected in 3-ml. fractions using a standard fraction collector.

Fractions were analyzed as follows. A ninhydrin reagent was prepared as a 0.1% solution in a citrate buffer. The citrate buffer was made by mixing 200 ml. of 1 N caustic soda with citric acid, enough acid being added to give a pH of 5.0. Each 3-ml. fraction was mixed with 1 ml. of the ninhydrin reagent, and the mixture placed in boiling water for 20 minutes. The development of a blue color indicated the presence of amino acid, while no color indicated the absence of such acid. The following qualitative data may be tabulated:

| Fraction Nos.: | Test results |
| --- | --- |
| 1–30 | Negative |
| 31–81 | Blue |
| 82–89 | Negative |
| 90–119 | Blue |
| 120–150 | Negative |
| 151–179 | Blue |
| 180–200 | Negative |

Referring to the group of Nos. 31–81, it will be understood that the blue color was less intense in the early fractions of the group, gradually became more intense, and then less intense, with the middle fraction having the most intense color. This phenomenon was also true of Nos. 90–119 and 151–179. The intensity of the color of a fraction was interpreted as being proportional to the concentration of amino acid therein. The test indicated that fraction Nos. 31–81 contained the d-aspartic acid, fraction Nos. 90–119 contained the dl-alanine, and fraction Nos. 151–179 contained the l-histidine.

The foregoing work was repeated using conventional carboxymethyl cellulose of the same D.S. as the adsorbent in the column, except that only 10 mg. each of the amino acids were taken instead of 20 mg. each. Such use of a lower level of amino acids was thought to increase the sensitivity of the mixture to the separating power of the adsorbent. Also, a faster flow rate was realized with the conventional derivative, namely, 3 ml. per 5 minutes. However, no separation of the amino acids was obtained, the qualitative test data being as follows.

Fraction Nos.: Test results
- 1–20 ............................................. Negative
- 21–39 ............................................ Blue
- 40–200 ........................................... Negative It is apparent that all three acids emerged from the column together in Nos. 21–39.

EXAMPLE 2

A casein hydrolysate was subjected to treatment using as the adsorbent the same derivative as described in the preceding example. Pure casein was hydrolyzed by refluxing the same for 6 hours in 150 ml. of concentrated hydrochloric acid. The casein had the following analysis: residue after ignition 2.0%, moisture 8.0%, protein 87.5%, nitrogen 13.7%, reducing sugar was present in trace amounts. The hydrochloric acid was C.P. grade, had a specific gravity of 1.19 and contained 37 to 38% of HCl. At the conclusion of the hydrolysis, an aliquot of the resulting hydrolysate solution was diluted with water so that the final concentration of the aliquot solution corresponded to approximately 4 mg. of the original casein per ml. of diluted aliquot solution. Two ml. of the diluted aliquot solution, equivalent to about 8 mg. of the original casein, was taken as the feed to be charged into the column.

As indicated, the column of the preceding example was used for the separation. The column was first washed with a mixture comprising 1 vol. of butanol, 2 vols. of isopropanol, and 1 vol. of 0.1 N HCl. After such washing, the wash liquid was displaced from the column by pouring into it a mixture comprising 1 vol. of butanol, 2 vols. of isopropanol, and 1 vol. of water, a step described as "equilibration" of the column. Then the casein hydrolysate feed material was added to the top of the column, and when the level of the feed corresponded with the top surface of the adsorbent in the column, eluting solvent was introduced, such solvent being the same as that used in the preceding example. The flow rate of the solvent was also the same as in the preceding example. Three ml. fractions were collected and were analyzed for amino acid content by the procedure described in "Colorimetric Methods of Analysis," by Snell and Snell, 3rd ed., Van Nostrand Co., Inc., pp. 107–108 (1954). This procedure is a quantitative method wherein the intensity of colors are measured with a spectrophotometer, the intensities so measured being used to calculate the optical density, as set forth in the foregoing reference. The optical density is a measure of the absorbence of light by the amino acids; more particularly, it is the negative logarithm of the percent of transmitted light. By plotting the optical density against the fraction numbers, a curve was obtained having a very high, sharp peak at fraction No. 40 (optical density 0.61), the peak beginning at No. 35 and ending at No. 57. Fraction Nos. 1–34 had zero optical density. The balance of the fractions, No. 58 to No. 231, exhibited a small but gradually increasing optical density ranging from 0.03 to 0.21. The optical density data for Nos. 35 to 57 are as follows.

Fraction No.: Optical density
- 35 .............................................. 0.03
- 36 .............................................. .15
- 37 .............................................. .31
- 38 .............................................. .46
- 39 .............................................. .57
- 40 .............................................. .61
- 41 .............................................. .52
- 42 .............................................. .46
- 43 .............................................. .41
- 44 .............................................. .38
- 45 .............................................. .31
- 46 .............................................. .30
- 47 .............................................. .28
- 48 .............................................. .24
- 49 .............................................. .22
- 50 .............................................. .17
- 51 .............................................. .15
- 52 .............................................. .10
- 53 .............................................. .09
- 54 .............................................. .05
- 55 .............................................. .04
- 56 .............................................. .02
- 57 .............................................. .01

The material in Nos. 35–57 comprised principally glutamic acid together with some aspartic acid. More specifically, Nos. 35–46 contained principally glutamic acid and Nos. 46–57 contained principally aspartic acid. Fraction No. 40 contained about 4% by weight of the amino acid content of the original casein.

EXAMPLE 3

Two ml. of impure lauric acid (Eastman's practical grade) in ethanol (0.1 gm. lauric acid per 25 ml. ethanol) were placed on a column (0.8 cm. x 30 cm.) which had been equilibrated with ethanol. The column material comprised the reaction product of the cellulose crystallite aggregates, as described in Example 1, with triethanolamine and epichlorhydrin in the presence of caustic soda; the material was believed to contain basic groups provided by the triethanolamine. The sample was eluted with ethanol under a pressure of 5 lbs. of nitrogen. The flow rate was 2 ml. per 5 minutes. Concentrations of the fractions were followed by means of a Brice-Phoenix differential refractometer, Model BP–1,000–V. This instrument was able to read the difference in refractive index between a sample of the eluant and sample of the fraction. Thus, if both samples were ethanol, the reading on the instrument would be zero. If the fraction sample contained some eluted impurity, the reading of the instrument would be the differential refractive index, indicating that some component, i.e., the impurity, was present in the fraction. The higher the differential refractive index, the more component in the fraction. In short, differential refractive index is proportional to the concentration of component in the fraction.

Fraction No.: Difference in refractive index
- 1 ............................................... 0
- 2 ............................................... 0.123
- 3 ............................................... 0.046
- 4 ............................................... 0
- 5 ............................................... 0
- 6 ............................................... 0.049
- 7 ............................................... 0.045
- 8 ............................................... 0.010
- 9 ............................................... 0.133
- 10 .............................................. 0.214
- 11 .............................................. 0.094
- 12 .............................................. 0.037
- 13 .............................................. 0.025
- 14 .............................................. 0.018
- 15 .............................................. 0.030
- 16 .............................................. 0.021
- 17 .............................................. 0
- 18 .............................................. 0.006
- 19–30 ........................................... 0

Upon plotting the foregoing data on coordinate paper, there was obtained a curve showing the variation of fraction number with differential refractive index; the first two peaks of this curve represent impurities comprising organic compounds having less than 12 carbon atoms per molecule. The third peak, corresponding to fraction No. 10, is the highest and represents pure lauric acid. Two subsequent small peaks represent impurities comprising organic compounds having more than 12 carbon atoms.

EXAMPLE 4

Two ml. of impure myristic acid (Eastman) in ethanol (0.1 gm. myristic acid per 25 ml. ethanol) were placed on a packed column (0.8 cm. x 30 cm.) which had been equilibrated with ethanol. The column material was the same as that used in Example 3. The sample was eluted with ethanol under a pressure of 5 lbs. of nitrogen. The flow rate was 2 ml. per 5 min. Concentrations of the fractions were followed by means of the Brice-Phoenix differential refractometer.

| Fraction No.: | Difference in refractive index |
|---|---|
| 1 | 0 |
| 2 | 0 |
| 3 | 0 |
| 4 | 0 |
| 5 | 0.028 |
| 6 | 0 |
| 7 | 0 |
| 8 | 0.046 |
| 9 | 0.022 |
| 10 | 0 |
| 11 | 0.208 |
| 12 | 0.304 |
| 13 | 0.219 |
| 14 | 0.060 |
| 15 | 0.036 |
| 16 | 0.067 |
| 17 | 0.043 |
| 18 | 0.099 |
| 19 | 0.075 |
| 20 | 0.075 |
| 21 | 0.075 |
| 22 | 0.075 |
| 23 | 0.089 |
| 24 | 0.084 |
| 25 | 0.072 |
| 26 | 0.079 |
| 27 | 0.039 |
| 28 | 0.070 |
| 29 | 0.048 |
| 30 | 0.075 |
| 31 | 0.020 |
| 32 | 0 |
| 33 | 0 |
| 34 | 0 |
| 35 | 0 |

By plotting the foregoing data on coordinate paper, the resulting curve has its highest peak corresponding to Fraction No. 12 and represents pure myristic acid. Smaller peaks preceding and following the highest peak represent organic impurities containing, respectively, fewer than and more than 14 carbon atoms per molecule.

EXAMPLE 5

Cellulose crystallite aggregates were prepared by hydrolyzing Ketchikan sulfite wood pulp with 0.5% HCl for 60 minutes at 250° F. The aggregates were washed with water, after which they were spray dried. They had an average level-off D.P. of about 220. Ten pounds of the dried aggregates were mixed with 200 pounds of water to give a slurry having a liquor:solids ratio of 20:1. Then 0.5 pound of sodium borohydride (5% by weight based on the aggregates) was added in successive small amounts to the mix followed by a sufficient quantity of sodium borate buffer to raise the pH of the mix to 9.5–10.0. The mixture was then heated at 30° C., with stirring, for two hours after which the alkaline reaction mixture was acidified with aqueous HCl solution to a pH of 6.0, filtered, and the product washed with deionized water to remove solids. The washed material was spray dried to give a very white powder product comprising the reduced aggregates.

Two mg. of impure, commercial grade aspartic acid dissolved in ethanol were placed on the top of a glass column packed with the borohydride-reduced aggregates. The column had a diameter of 1.5 cm. and was 57 cm. long. The sample was eluted with a solvent comprising 1 volume of n-butanol, 2 volumes of isopropanol, and 1 volume of 0.1 N aqueous HCl solution under a pressure of 5 p.s.i.g. of nitrogen. The effluent from the column was collected in 5 ml. fractions by means of a standard fraction collector, the fractions evaluated by means of the above described colorimetric method employing ninhydrin, and the optical densities determined with a Bausch & Lomb, Spectronic 20, spectorophotometer. The optical density is a measure of the intensity of color formed by reaction of the ninhydrin with the amino acid. The higher the optical density, the greater the concentration of amino acid. The optical density values of the fractions are given below, together with the optical densities of fractions obtained in the same way as described except that non-reduced eggregates were employed as the column adsorbent throughout a length of 55 cm. The non-reduced aggregates had been found to be of value in previous work.

In the same way, samples of impure glutamic acid of commerce were subjected to purification using the foregoing procedure. The data are as follows:

| | Optical density | | | |
|---|---|---|---|---|
| | Aspartic acid | | Glutamic acid | |
| | Borohydride-reduced aggregates | Non-reduced aggregates | Borohydride-reduced aggregates | Non-reduced aggregates |
| Fraction No.: | | | | |
| 5 | | | .07 | 0 |
| 10 | 0 | .01 | .04 | .06 |
| 11 | 0 | .01 | .04 | .2 |
| 12 | 0 | .005 | .22 | .01 |
| 13 | .02 | .02 | 1.2 | .03 |
| 14 | .075 | .08 | 1.9 | .22 |
| 15 | .40 | .18 | .23 | .72 |
| 16 | .76 | .31 | .01 | 1.21 |
| 17 | .23 | .36 | 0 | .60 |
| 18 | .03 | .24 | 0 | .27 |
| 19 | .005 | .13 | 0 | .12 |
| 20 | 0 | .05 | 0 | .09 |
| 21 | 0 | .04 | | |
| 22 | 0 | .025 | | |
| 23 | 0 | .02 | | |
| 24 | 0 | .02 | | |

When using reduced aggregates, the peaks are higher, sharper, and narrower. Thus, for aspartic acid, the reduced aggregates provide only three rich fractions, Nos. 15–17, inclusive, with a peak of 0.76 in No. 16; while with the non-reduced aggregates, there are five rich fractions, Nos. 15–19, and a peak of only 0.36 in No. 17. It is apparent that the reduced aggregates gave more concentrated fractions. For glutamic acid, the reduced aggregates provide only four rich fractions, Nos. 12–15, with a peak of 1.9 in No. 14; while the non-reduced aggregates gave five rich fractions, Nos. 14–18, and a peak of only 1.21 in No. 16.

EXAMPLE 6

Casein hydrolysate was prepared by refluxing 50 grams of casein in 500 ml. of equal volumes of concentrated hydrochloric acid and water for 24 hours. The hydrochloric acid was C.P. grade, had a specific gravity of 1.19, and contained 37 to 38% of HCl. The reflux mixture was concentrated to about 100 ml. under a vacuum and at a temperature of 35° C. The concentrate was then filtered and aliquots of it were used as samples for chromatography.

A sample of 8 mg. of the casein hydrolysate concentrate was placed on top of a column containing borohydride-reduced cellulose crystallite aggregates, the latter having been prepared as in Example 5. The column had a diameter of 1.5 cm. and a length of 57 cm. Eluting solvent, comprising a mixture of n-butanol, isopropanol, and 0.1 N aqueous HCl solution in a volume ratio of 1:2:1, was introduced to the top of the column, and 5 ml. fractions were collected. Optical density values were obtained on the fractions.

In the same way, an 8 mg. sample of casein hydrolysate concentrate was passed through a 1.5 cm. by 55 cm. column of non-reduced aggregates, using the same eluting solvent, and optical densities were obtained on the fractions. The data are as follows:

|  | Optical Density | |
|---|---|---|
|  | Borohydride-reduced aggregates | Non-reduced aggregates |
| Fraction No.: |  |  |
| 5 | .01 | 0 |
| 6 | .005 | .01 |
| 7 | 0 | .01 |
| 8 | .06 | .05 |
| 9 | .68 | .61 |
| 10 | .60 | .575 |
| 11 | .40 | .54 |
| 12 | .18 | .59 |
| 13 | .36 | .30 |
| 14 | 1.49 | .42 |
| 15 | .58 | .95 |
| 16 | .43 | .85 |
| 17 | .38 | .66 |
| 18 | .50 | .55 |
| 19 | .55 | .50 |
| 20 | .30 | .50 |
| 21 | .15 | .27 |
| 22 | .02 | .38 |
| 23 | .01 | .34 |
| 24 | .005 | .26 |
| 25 | 0 | .19 |
| 30 | 0 | .06 |
| 35 | .01 | .02 |
| 40 | .075 | .04 |
| 45 | .05 | .06 |
| 50 | .01 | .06 |
| 55 | .02 | .05 |
| 60 | 0 | .03 |

For the non-reduced aggregates, it is evident that some separation of amino acids occurred, but the peaks are lower and less narrow than in the case of the reduced aggregates. The main component, glutamic acid, is separated fairly well by the reduced aggregates, being formed in three fractions, Nos. 13–15, inclusive, with a peak of 1.49 in No. 14; whereas the non-reduced aggregates concentrate this component in seven fractions, Nos. 13–19, inclusive, with a peak of 0.95 in No. 15. Also interesting is the fact that the first significant component is concentrated by the reduced aggregates in three fractions, Nos. 9–11, while the non-reduced aggregates concentrate it in five fractions, Nos. 9–13.

EXAMPLE 7

Impure commercial grades of tryptophan and tyrosine, and enzyme-hydrolyzed casein were separated by means of the borohydride-reduced aggregates as prepared in Example 5.

The tryptophan material, in an amount of 0.1 gm., was dissolved in eluant and passed through a column, 3 cm. by 74 cm., using a 4:4:1 volume ratio of n-butanol-water-acetic acid eluant, fractions of 9.5 ml. being taken.

The tyrosine material, also in an amount of 0.1 gm., and dissolved in eluant, was passed through a 3 cm. by 62 cm. column using the same eluant. In this case, the fractions were 12 ml.

The casein hydrolysate was prepared by dissolving 6 gm. of casein in 100 ml. of 0.5 N caustic soda, adjusting the pH of the resulting solution to 8.0 with concentrated phosphoric acid, adding 0.3 gm. of enzyme (Rhozyme A4, made by Rohm & Haas Co.), and then placing the mixture in a constant temperature bath at 50° C. for one week. The enzyme was deactivated by heating the solution at 80° C. for 30 minutes, after which the solution was passed through a 1.5 cm. by 56 cm. column. A 1:2:1 volume ratio of n-butanol-isopropanol 0.1 N HCl solution was used to elute the mixture giving fractions of 3 ml. each.

The following optical density data were obtained:

| Fraction No. | Optical density of tryptophan | Fraction No. | Optical density of tyrosine | Fraction No. | Optical density of enzyme-hydrolyzed casein |
|---|---|---|---|---|---|
| 40 | .01 | 22 | .03 | 15 | .04 |
| 41 | .02 | 23 | .04 | 16 | .06 |
| 42 | .40 | 24 | .04 | 17 | .07 |
| 43 | 1.90 | 25 | .05 | 18 | 1.0 |
| 44 | 2.0 | 26 | .06 | 19 | 2.0 |
| 45 | 2.0 | 27 | .90 | 20 | 1.43 |
| 46 | 1.5 | 28 | 1.84 | 21 | .87 |
| 47 | .58 | 29 | 1.93 | 22 | 1.4 |
| 48 | .05 | 30 | 1.98 | 23 | 1.6 |
| 49 | .05 | 31 | 1.98 | 24 | 1.62 |
| 50 | .04 | 32 | 1.92 | 25 | 1.8 |
| 55 | .02 | 33 | 1.82 | 26 | 1.4 |
|  |  | 34 | 1.5 | 27 | 1.42 |
|  |  | 35 | 1.4 | 28 | 1.5 |
|  |  | 36 | 1.0 | 29 | 1.5 |
|  |  | 37 | .9 | 30 | 2.0 |
|  |  | 38 | .77 | 31 | 2.0 |
|  |  | 39 | .5 | 32 | 2.0 |
|  |  | 40 | .05 | 33 | 2.0 |
|  |  | 41 | .02 | 34 | 1.9 |
|  |  | 42 | .02 | 35 | 1.35 |
|  |  |  |  | 36 | .7 |
|  |  |  |  | 37 | .3 |
|  |  |  |  | 38 | .22 |
|  |  |  |  | 39 | .2 |
|  |  |  |  | 40 | .19 |
|  |  |  |  | 45 | .12 |
|  |  |  |  | 50 | .05 |

The data indicate the sharpness of the separations. In each case, the peaks appear abruptly and disappear just as quickly. They are quite narrow. For example, in the case of tryptophan, the peak begins just after fraction No. 41, reaches a maximum in Nos. 44 and 45, and is gone in No. 48. In the case of the enzyme-hydrolyzed casein, several peaks occur, indicating separations, and their sharpness indicate that the separations are efficient. The first peak at No. 19 indicates a fairly efficient separation of glutamic acid.

By simple plots of the data of the examples on coordinate paper, graphic representations of the various peaks may be had, showing their height, width and relationship to the other peaks.

It is desirable to employ the chromatographic adsorbents in granular rather than powdered form in order to promote good flow rates. Suitably, the granules may have a size in the range of 44 to 75 microns, or 200 to 325 mesh. If desired, an inert material may be mixed with the adsorbents to increase the porosity. Small glass beads comprise a suitable inert material; preferably they have smooth surfaces and are of a size comparable to that of the adsorbent granules. Another appropriate porosity-increasing diluent comprises ion-exchange resins in the form of granules of the foregoing sizes; these resins, of course, are not inert and may be chosen to assist in the separation process. If also desired, the adsorbents may be at least partially reacted with a cross-linking agent such as formaldehyde which may react with the hydroxyl groups in the molecular chains of the reduced aggregates to give what may be termed a network polymer which may provide increased flow rates.

From a broader standpoint, the crystallite aggregates derivatives have useful applications to the separation, recovery, and/or purification of mixtures and compositions of varied character. Thus, they may be employed to separate such materials as racemates, lipids, antihistaminic drugs, straight- and branched-chain compounds, rare earths; also to recover organic acids like citric, ascorbic, tartaric, etc. from slops and citrus wastes, as well as to purify such acids and higher molecular weight unsaturated and saturated fatty acids like linoleic, linolenic, oleic, ricinoleic, stearic, palmitic, etc. Amino acids and vitamins may be recovered from food processing wastes, enzymes from natural sources, metals from treating baths such as pickling and anodizing baths, copper from the spinning waste waters of cuprammonium rayon, valuable metals such as silver from photographic wastes. The invention is also of value for purifying antibiotics, chemical intermediates, tannins, nitrites, hexosephosphates, complex alcohols, hormones, toxins, growth regulators, higher fatty alcohols, dyes, etc. Alkaloids, comprising natural nitrogenous organic bases, generally tertiary amines, may be purified. Plant pigments may be isolated from natural mixtures of the same; thus, carotene may be separated from other plant pigments. Heavy metal impurities like copper and iron may be removed from wine, and the wine otherwise improved with respect to its purity, organoleptic and other qualities. Whiskey may be similarly improved. Water may be softened or completely deionized.

It will be understood, of course, that in these operations a cation-exchange derivative will be employed to absorb cationic substances and that an anion-exchange derivative will be used to adsorb anionic substances. It will also be appreciated that in some of the foregoing applications, such as the softening or deionization of water, or the demineralization of solutions to free them of mineral impurities or to recover valuable metals, the general procedure comprises pouring the feed mixture, such as one from which the impurities are to be removed, into the column of adsorbent. The effluent will be the demineralized feed, while the mineral or metal impurities are retained on the column and may be suitably removed.

Of interest is an experiment performed with a mixture of dyes. Approximately 50 mg. each of the following three water-soluble dyes were mixed in 250 ml. of water: Parakeet Yellow No. 5, Parakeet Red No. 2, and Parakeet Green No. 1. Two columns were then set up, one containing conventional carboxymethyl cellulose in fibrous form and the other containing carboxymethyl cellulose crystallite aggregates in particulate non-fibrous form. The same amount of dye mixture was poured into the top of each column at the same time and then simply allowed to descend by gravity. After about 2 hours, the two columns were examined. In the column containing the conventional cellulose derivative, the lowermost part of the column, comprising about 1/5 of the length was not wetted; immediately above it there was a yellow band comprising about 2/5 of the column, and above this there was a green band also comprising about 2/5 of the column. In the column containing the aggregates derivative, the lowermost portion of the column, about 1/5 of the length was not wetted; above it was a wide blue band comprising about 1/5 of the column; above the latter were three narrow bands of light green, reddish brown, and light green, respectively; above the last mentioned band was a wide light blue band comprising about 1/5 of the column; and finally at the top of the column there was a green band of fairly substantial width. It was apparent that the aggregates derivative was able to separate the color mixture into a greater number of components; furthermore, this derivative did not exhibit channeling, and the bands were sharply defined, whereas the conventional cellulose derivative exhibited channeling and indistinctly defined bands.

As indicated above, while the use of cellulose crystallite aggregates derivatives having ion-exchange properties are preferred, there are other derivatives of the crystallite aggregates, which, although not exhibiting an ion-exchange action because of the lack of ionizing groups, are nevertheless of value as adsorbents for separating, purifying, recovering, or otherwise treating the above-described feed mixtures. These latter derivatives are effective through the operation of adsorption, hydrogen bonding, and/or Van der Waals forces, etc. may include the following: ester derivatives of inorganic acids, such as the nitrate derivatives of the aggregates, and also nitrous acid esters, hypochlorous acid esters, and thiocyanic acid esters; also esters of organic acids, such as the acetate, propionate, butyrate, mixed acetate-propionate, mixed acetate-butyrate, benzoate, phenyl acetate, formate, laurate, stearate, lactate, naphthenate, crotonate, cinnamate, etc. derivatives of the aggregates. Still other derivatives are the alkyl and aryl sulfonic acid esters of the type having a moiety like —$SO_3R$ attached directly to a carbon atom of the anhydroglucose units of the aggregates. Also suitable are ether derivatives having a plurality of —OR groups wherein R is an aliphatic radical having 1 to 12 or more carbon atoms, preferably 1 to 6. Specific aliphatic radicals are the methyl, ethyl, propyl, isopropyl, butyl, isobutyl, pentyl, isopentyl, hexyl, etc. radicals, and including radicals substituted by suitable non-ionizable groups. Such substituted aliphatic radicals may include hydroxyalkyl, cyanoalkyl, halogenated alkyl, alkoxyalkyl, aralkyloxyalkyl, etc. R may also be aralkyl, which may be considered to be a substituted alkyl or aliphatic radical, and which may include groups such as benzyl, methylbenzyl, phenethyl, phenylpropyl, etc. R may also be aryl, such as phenyl, tolyl, xylyl, naphthyl, etc. Substituted aralkyl and aryl radicals similar to the substituted aliphatic radicals are suitable. Other suitable derivatives are ether-esters, such as the alkyl ethers of various esters of the aggregates, including ethers of the acetate and propionate esters and also those esters in the above-noted group of non-ionizable esters. Aldehyde derivatives are of value, particularly the dialdehyde prepared as disclosed in Pat. No. 3,111,513.

Any of the herein disclosed derivatives of the crystallite aggregates may be attrited in the presence of water to form a gel, and in this form is suitable for use in gel electrophoresis for separating mixtures, purifying impure compounds, recovering desired compounds, and the like.

A further advantage of the aggregates derivatives of the ion-exchange type is the fact that the exchangeable ions are more accessible than in the case of the resin type and conventional cellulose derivative materials. In the resin type materials, the exchanger is not usually a long chain polymer but rather is a three-dimensional network polymer having many exchangeable ions so located in the amorphous interior thereof as to be inaccessible to the exchanging ions and the eluting medium. And in the conventional cellulose derivatives, the presence of ionizable groups in the interior of the amorphous regions or matrices tends to make them less accessible. In the result, the aggregates derivatives, owing to the greater accessibility of their surface-located ionizable groups, tend to give a faster rate of exchange.

Another consideration resides in the tendency of some conventional materials to swell during use, and it is noteworthy that the aggregates derivatives swell much less in water than the derivatives of conventional cellulose. Of perhaps even more significance is the fact that the swelling of the latter derivatives is difficult if not impossible to control, a factor which is believed to be related to the presence of the amorphous regions in the molecular chains of the derivatives. The objection to swelling is that if it is sufficiently extensive, an undesirable resistance to the flow of feed or eluant develops. Where the swelling is difficult to control, it is obvious that flow resistance may become a serious factor.

Unlike the resin-type materials, the aggregates derivatives are inert to many solvents and thus afford a wide range of eluants and also of regenerants to be employed. Being less subject to attack, the derivatives are more easily regenerated than the resin-type materials. Furthermore, because of the absence of amorphous regions, they may be regenerated by means of a wider variety of agents than the conventional cellulose derivatives. The latter, owing to the presence of the amorphous areas, are subject to attack by acidic regenerants.

Of particular interest is the fact that the aggregates derivatives have a hydrophilic character. This is apparent because the cellulose crystallite aggregates, from which the derivatives are prepared, contain a large number of hydroxyl groups at least some of which survive the conversion of the aggregates to the derivatives. Because of their hydrophilicity, the derivatives are of particular value for separating feed mixtures whose components contain amino groups.

As used herein, the term "adsorbent" is intended to denote both the derivatives having ionizable groups and those that do not have such groups.

The terms "liquid mixture" or "flowable mixture" are used to designate separable feed mixtures which are in a liquid or liquefied or flowable state and include solutions, colloidal solutions, colloidal suspensions, and slurries. The terms also include melted mixtures if such mixtures are not liquid at normal temperatures. Colloidal suspensions may include suspensions of a separable virus, enzyme, protein, polypeptide, etc. Furthermore, some liquid feed mixtures may be introduced to a separating column without being first formed into a solution by the aid of a solvent.

Although the invention has been described in connection with specific embodiments of the same, it will be understood that it is capable of obvious variations without departing from its scope.

We claim:

1. A process for separating mixtures of amino acids in protein hydrolysates or mixtures of amino acids equivalent to those in protein hydrolysates prepared by organic synthesis into individual acids or into small groups thereof which comprises passing the mixture with a liquid eluant therefor into contact with a water-insoluble derivative of cellulose crystallite aggregates having a level-off degree of polymerization of 15 to 375 and having cation-exchange or nonionic functional groups, said derivative having a degree of substitution not greater than 1.0, absorbing at least a portion of said compounds on said derivative, and recovering at least one fraction containing fewer of said compounds than said mixture.

2. The process of claim 1 wherein the mixture is amino acids prepared by a synthesis reaction.

3. The process of claim 1 wherein the mixture of amino acids is in a protein hydrolysate.

4. The process of claim 3 wherein the protein hydrolysate is an animal protein hydrolysate.

5. The process of claim 3 wherein the protein hydrolysate is casein hydrolysate.

References Cited

UNITED STATES PATENTS

| | | | |
|---|---|---|---|
| 1,964,772 | 7/1934 | Schur et al. | 260—212 |
| 2,957,917 | 10/1960 | Garmaise et al. | 260—534 |
| 2,978,446 | 4/1961 | Battista et al. | 260—212 |
| 3,067,037 | 12/1962 | Herald et al. | 260—212 |

OTHER REFERENCES

Balston et al.: A Guide to Filter Paper and Cellulose Powder Chromatography, pp. 14, 23, 46 and 59, London, Reeve Angel, 1952.

Battista: Ind. Eng. Chem., vol. 42, pp. 502–7 (1950).

Blackburn: Chem. Ind., 1951, pp. 294–5.

Calmon et al.: Ion Exchangers in Organic and Biochemistry, pp. 335–8, New York, Interscience, 1957.

Hamilton: Anal. Chem., vol. 30, pp. 914–9 (1958).

NATALIE TROUSOF, Primary Examiner

U.S. Cl. X.R.

23—15, 50, 55, 102, 230; 210—31, 198; 260—112, 209, 212, 219, 236, 236.5, 326.14, 326.3, 343.7, 419, 420, 473.5, 518, 519, 529, 534, 535, 536, 643, 666; 424—94, 95, 103, 106, 114, 115, 123

UNITED STATES PATENT OFFICE
CERTIFICATE OF CORRECTION

Patent No. 3,562,289      Dated Feb. 9, 1971

Inventor(s) Orlando A. Battista & Charles J. Boone

It is certified that error appears in the above-identified patent and that said Letters Patent are hereby corrected as shown below:

> Col. 2, line 25, "matreial" should read --material--; line 51, "crytsallite" should read --crystallite--. Col. 3, line 38, "many" should read --may--. Col. 4, line 30, "Patricle" should read --Particle--; line 72, "ethorixe" should read --ethoxide--. Col. 12, line 9, "spectorophotometer" should read --spectrophotometer--; line 16, "eggregates" should read --aggregates--.
>
> Signed and sealed this 3rd day of August 1971.

(SEAL)
Attest:

EDWARD M. FLETCHER, JR.       WILLIAM E. SCHUYLER,
Attesting Officer      Commissioner of Pate